UNITED STATES PATENT OFFICE.

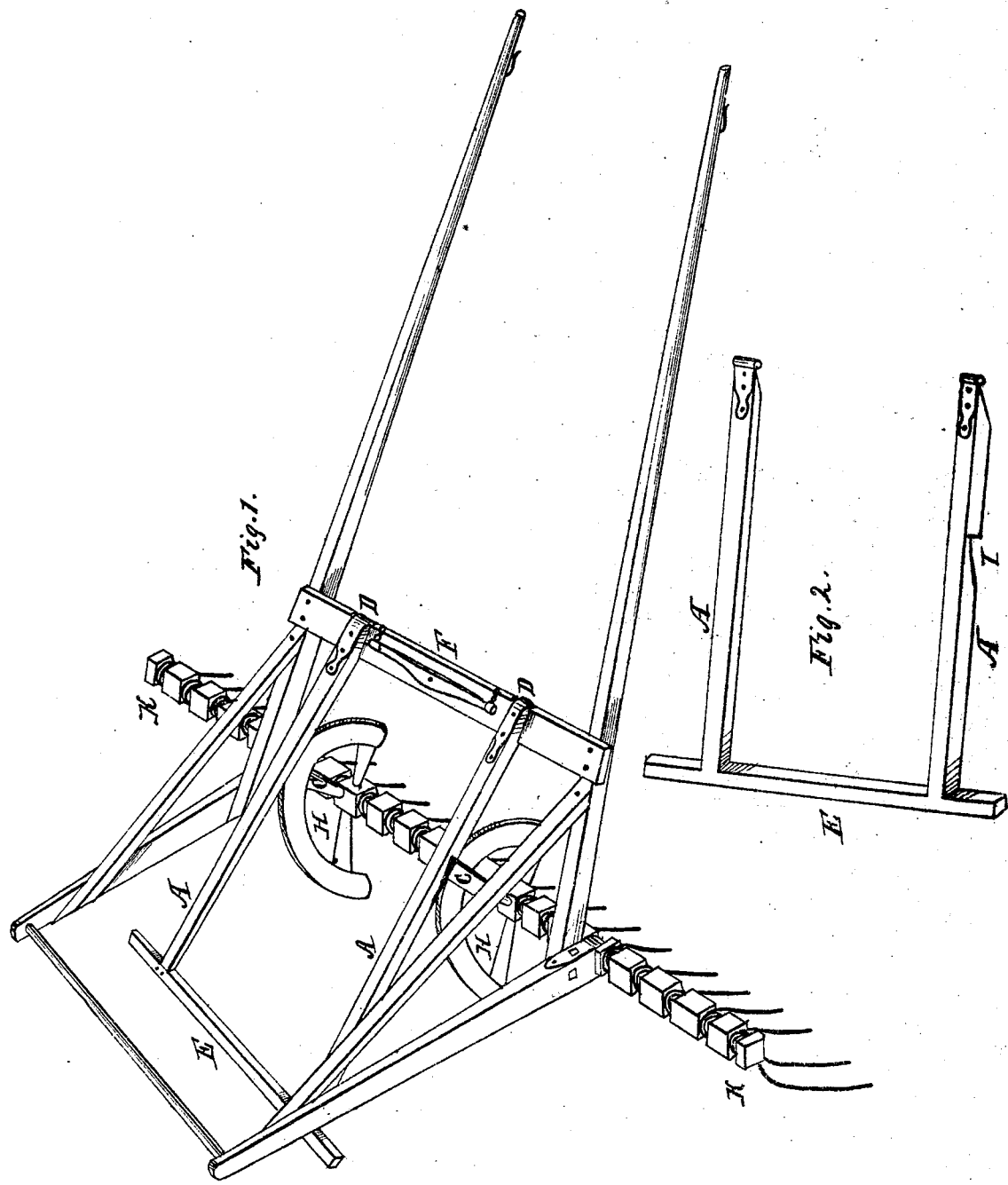

JNO. M. STAFFORD, OF PIKE, NEW YORK.

IMPROVEMENT IN HORSE-RAKES.

Specification forming part of Letters Patent No. 5,291, dated September 11, 1847.

*To all whom it may concern:*

Be it known that I, JOHN M. STAFFORD, of Pike, in the county of Wyoming and State of New York, have invented a new and valuable Improvement in Lorin M. Whitman's Improved Horse-Rake; and I do hereby declare that the following is a full and exact description of the same.

The nature of my invention consists in dispensing entirely with the stop-bars as used in L. M. Whitman's rake, and providing an apparatus which shall not interfere with the free operation of the rake, and accomplish the same purposes by a new mode.

To enable others skilled in the art to make and use my invention, I will proceed to describe its construction and operation.

I dispense with the stop-bar of Mr. Whitman's rake, the mortises in the handles in which the stop-bar slides, and the projections of the outer spokes of the segments of wheels, which serve as catches to the stop-bar. I make use of two shafts, A A, which I term "keepers," and which are attached by the hinges D D to the cross-piece F. These keepers extend backward and rest upon the segment of wheels H H at the central spokes, C C, and terminate with the attached cross-bar E, as in the drawing. The cross-bar E secures them in their proper position, parallel with one another. On the under sides of the keepers I cut notches or gains, as represented at I, Fig. 2, with shoulders on the forward parts of the same, and which are at a sufficient distance forward of a perpendicular line passing through the center of the head K K to hold the head in a position proper for raking. The central spokes, C C, of the segments of wheels H H extend an inch or more beyond the circumference thereof and are made to fit into the notches or gains in the keepers A A.

The operation is as follows: The rake, being supposed to be in such a position that the circumferences of the segments rest upon the ground, is moved forward. The segments revolve until the central spokes enter the gains or notches in the keepers and strike the shoulders in the same, when the further revolution is stopped and the operation of raking commences. When it becomes necessary to clear the rake of the accumulated hay or grain, the keepers may be lifted by means of the cross-bar E, the center spokes of the segments are released from the notches or gains in the keepers, and the head of the rake revolves, carrying with it the segments H H. The segments continue to revolve until the central spokes enter the notches or gains and are arrested in their revolution by the shoulders of the same, when the operation of raking again commences.

Having thus described the nature and operation of my improvement, what I claim as my invention, and desire to secure by Letters Patent, is—

The combination of the shafts or keepers with the segments of the horse hay-rake, as above described, not intending, however, by this claim to confine myself to the use of two shafts or keepers, but to make use of two or one, as I may think proper, while I attain the same ends by substantially the same means.

JOHN M. STAFFORD.

Witnesses:
JAS. W. LLOYD,
HORACE THOMAS.